US009604257B2

(12) United States Patent
Li et al.

(10) Patent No.: US 9,604,257 B2
(45) Date of Patent: Mar. 28, 2017

(54) AUTOMATED WASTE MAIL VERIFICATION

(71) Applicants: Hongjian Li, Coppell, TX (US); Peter Parker, Keller, TX (US); Asif Bilal Ahmed, Irving, TX (US); Janusz Pieniadz, Arlington, TX (US)

(72) Inventors: Hongjian Li, Coppell, TX (US); Peter Parker, Keller, TX (US); Asif Bilal Ahmed, Irving, TX (US); Janusz Pieniadz, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 188 days.

(21) Appl. No.: 13/892,679

(22) Filed: May 13, 2013

(65) Prior Publication Data

US 2013/0299396 A1 Nov. 14, 2013

Related U.S. Application Data

(60) Provisional application No. 61/645,729, filed on May 11, 2012, provisional application No. 61/645,719, filed on May 11, 2012.

(51) Int. Cl.

| | |
|---|---|
| ***G06K 9/00*** | (2006.01) |
| ***B07C 5/34*** | (2006.01) |
| ***B07C 7/00*** | (2006.01) |
| ***B07C 3/14*** | (2006.01) |

(52) U.S. Cl.

CPC .............. *B07C 5/3412* (2013.01); *B07C 3/14* (2013.01); *B07C 7/005* (2013.01)

(58) Field of Classification Search

CPC ......... B07C 5/3412; B07C 3/14; B07C 7/005; B07C 3/00; B07C 3/18; B07C 5/34; B07C 2301/0025; B07C 2301/0075; G06F 7/06; G06F 7/08; G06F 7/10; G07B 17/00508

USPC .................. 209/583, 584, 900; 700/223–227

See application file for complete search history.

(56) References Cited

U.S. PATENT DOCUMENTS

| | | | | |
|---|---|---|---|---|
| 8,925,813 | B2 | 1/2015 | Ahmed et al. | |
| 2005/0189409 | A1 | 9/2005 | Conard et al. | |
| 2006/0043183 | A1 | 3/2006 | Nihommatsu | |
| 2009/0143898 | A1 * | 6/2009 | Kiani et al. | 700/226 |
| 2010/0230328 | A1 * | 9/2010 | Bonnell et al. | 209/584 |

OTHER PUBLICATIONS

Non-Final Office Action issued in U.S. Appl. No. 13/892,647 on Apr. 4, 2014, 7 pages.

Final Office Action issued in U.S. Appl. No. 13/892,647 on Jul. 8, 2014, 8 pages.

* cited by examiner

*Primary Examiner* — Joseph C Rodriguez
*Assistant Examiner* — Kalyanavenkateshware Kumar

(57) ABSTRACT

A method for automatically sorting undeliverable as addressed (UAA) mail can include capturing a first image of a first UAA mail piece with a camera to create first image data, passing the first image data to a waste verification system and performing optical character recognition to produce a first character recognition data set. The method includes testing the first character recognition data set to determine whether the first UAA mail piece is a verified waste mail piece. If the first UAA mail piece is a verified waste mail piece, the method includes routing the first UAA mail piece into a first bin. If the first UAA mail piece is not a verified waste mail piece, routing the mail piece to a second bin.

20 Claims, 2 Drawing Sheets

AUTOMATED WASTE MAIL VERIFICATION

CROSS-REFERENCE TO RELATED APPLICATION

This application claims the benefit of the filing date of U.S. Provisional Patent Application 61/645,719, filed May 11, 2012, which is hereby incorporated by reference. This application also claims the benefit of the filing date of U.S. Provisional Patent Application 61/645,729, filed May 11, 2012, which is hereby incorporated by reference. This application shares some common subject matter with commonly assigned, concurrently filed U.S. patent application Ser. No. 13/892,647 to Ahmed et al., titled "Labeling for Automatic Mail Sorting System", which is hereby incorporated by reference.

TECHNICAL FIELD

The present disclosure is directed, in general, to automated mail sorting equipment and methods.

BACKGROUND OF THE DISCLOSURE

Mail delivery is an important function and adds value to the economy far exceeding its cost. The United States Postal Service delivers billions of pieces of mail each year. The systems in place have a long history. New layers of processes are added over previous layers, in an attempt to optimize the overall delivery of mail pieces. The reasoning behind the existing systems is not always transparent. Many competing and conflicting considerations may have been built into the current processes.

SUMMARY OF THE DISCLOSURE

Disclosed embodiments relate to a method for automatically sorting undeliverable as addressed (UAA) mail which includes capturing a first image of a first UAA mail piece with a camera connected to an automated mail transport to create first image data, and passing the first image data to a waste verification system and performing at least optical character recognition on the first image data using the waste verification system to produce a first character recognition data set. The method includes testing the first character recognition data set to determine whether the first UAA mail piece is a verified waste mail piece. If the first UAA mail piece is a verified waste mail piece, the method includes routing the first UAA mail piece into a first bin. The method includes testing the first character recognition data set to determine whether the first UAA mail piece is not verified as a waste mail piece. If the first UAA mail piece is not a verified waste mail piece, routing the mail piece to a second bin.

Disclosed embodiments relate to an automatic mail sorting equipment, configured to capture a first image of a first UAA mail piece with a camera connected to an automated mail transport to create first image data, and pass the first image data to a waste verification system and perform at least optical character recognition with the waste verification system on the first image data to produce a first character recognition data set. The equipment is further configured to test the first character recognition data set to determine whether the first UAA mail piece is a verified waste mail piece, and if the first UAA mail piece is a verified waste mail piece, route the first UAA mail piece into a first bin. The equipment is further configured to test the first character recognition data set to determine whether the first UAA mail piece is not verified as a waste mail piece, and if the first UAA mail piece is not a verified waste mail piece, route the mail piece to a second bin.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
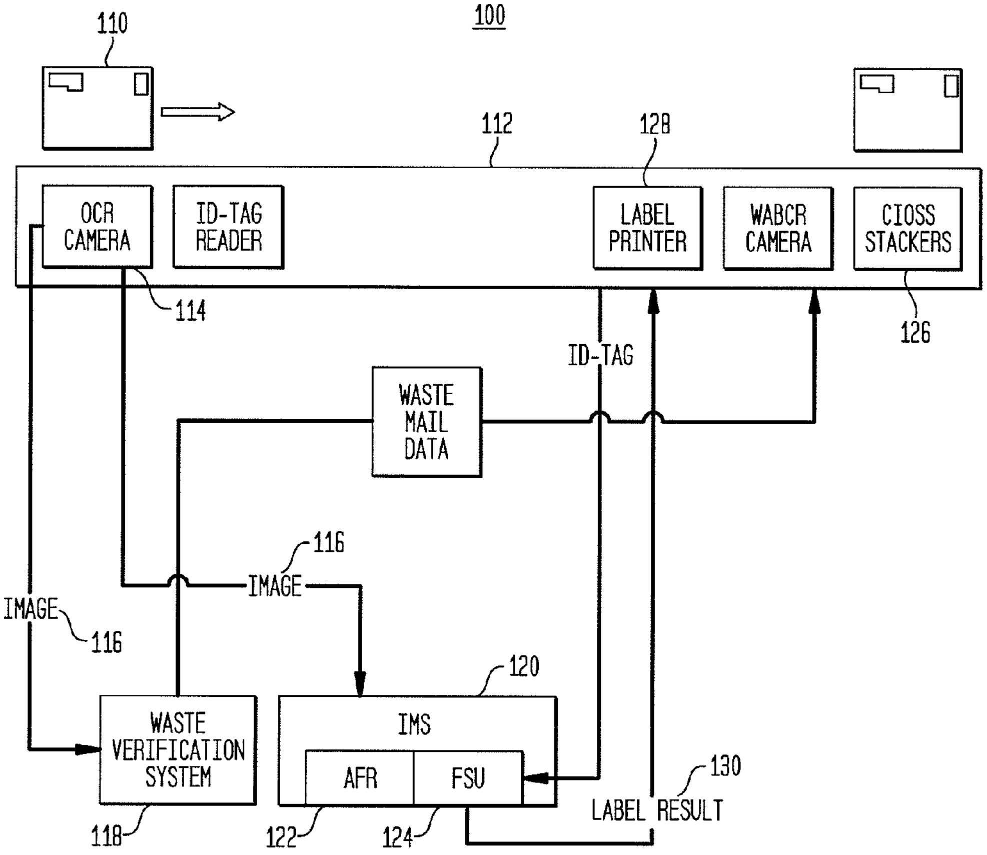
FIG. 1 depicts an automated waste mail sorting system in accordance with disclosed embodiments.
Figure 2:
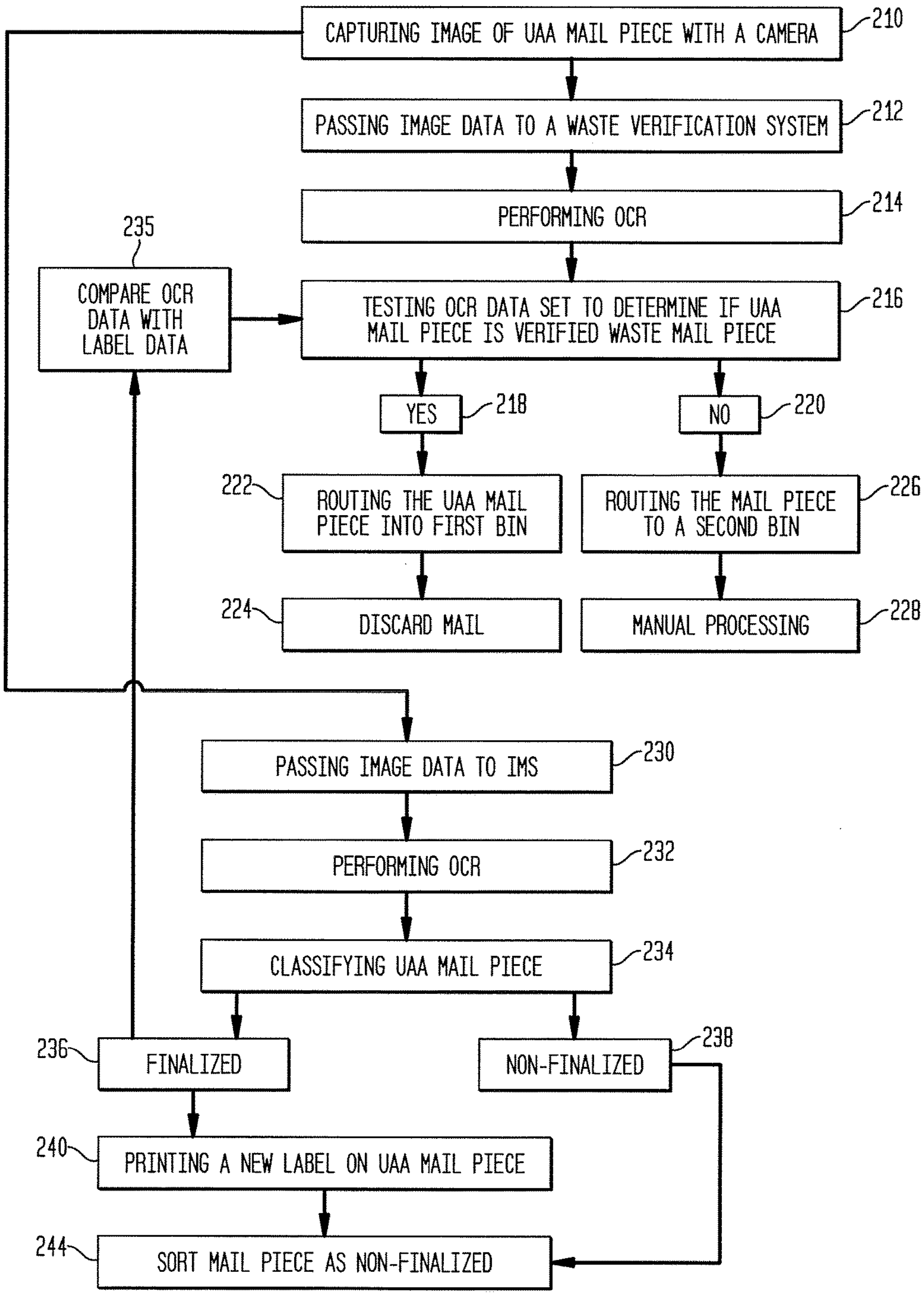
FIG. 2 depicts a method for automatically sorting waste mail in accordance with disclosed embodiments.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The United States Postal Service (USPS) processes its Undeliverable As Addressed (UAA) mail on a system called PARS (Postal Address Redirection System). Much of the UAA mail requires human intervention to process, and this takes time. The PARS system scans UAA mail in the first run, then stages (or temporarily stores) the mail while redirect information is retrieved, and then labels it in the second run. While certain embodiments are discussed below in the context of a PARS system, the appended claims are intended to apply to any system that operates or is structured as claimed.

Mail that cannot be delivered to an address on the mail piece can be called UAA mail. There can be several reasons for this condition. The person may have moved from the address, the address may not exist anymore, or the address may name the wrong person. UAA mail processing can be very expensive. The USPS can have an annual volume of over 4 billion UAA mail pieces (approximately 2-3% of total mail volume). PARS automates this process to reduce the cost of processing UAA mail pieces. UAA mail can be classified into three main types, depending on origin.

Intercept (INT) is UAA mail that can be identified as UAA automatically by the PARS system before the mail-carrier tries to deliver it. These mail pieces are separated, and are redirected to the final destination by the PARS system the first time. This type of UAA mail can account for approximately 40% of the UAA volume.

Carrier Identified Forward (CIF) is UAA mail that the mail-carrier (postman) tries to deliver, but identifies it as mail that needs to be forwarded to a new address. This type of UAA mail can account for approximately 20% of UAA volume.

Return To Sender (RTS) is mail that the mail-carrier (postman) tries to deliver, but wants it returned to the sender due to various postal rules. RTS mail can account for approximately 40% of the UAA volume. All of these different types of UAA mail can be processed using methods that can require two runs or passes through an automated sorting machine.

When a decision is reached about how to route a piece of UAA mail, the UAA mail is considered finalized. UAA mail is finalized in one of four categories: i) Forwarded to a New Address; ii) Returned to the Sender; iii) Waste; and iv) Sent for Manual Handling or Rejected. Waste mail is any mail which is to be discarded rather than delivered to the originally intended recipient. The mail may be discarded by law, rule, regulation, or business practice. For example, the sender may not have paid for mail forwarding service. In this instance, the postage class must be verified before consigning the mail piece to a waste bin.

Based on the information on the mail piece and postal rules, over 500 Million UAA mail pieces were finalized as 'Waste' mail in FY 2011. The current process requires that a human verifies that the mail piece can be disposed as 'Waste'. The human error rate for such verification is 3-5% for similar tasks.

Automated mail sorting machines can be adapted to process UAA mail in one run, as disclosed in copending U.S. patent application Ser. No. 13/892,647 to Ahmed et al., filed concurrently herewith, which is incorporated by reference above. However, when UAA mail is finalized, much of it can be classified as waste mail, which can require manual handling. This can increase the percentage of the sorted mail which must be further processed after automated sorting.

While not all waste mail can be automatically verified, a substantial portion, even a great majority, may be susceptible to automated processing. While automated sorting may not accomplish this task fully, much of the waste mail can be eliminated from manual processing. This can be done in parallel with an online labeling system which is capable of finalizing UAA mail in one pass. Because the tasks of forwarding mail and verifying waste mail are different, they can be handled by different sub-systems within the automatic mail sorting system.

A waste verification process can consist of 4 steps to verify that a mail piece is correctly labeled as a waste piece. If a mail piece does not pass these four tests, then it needs to be removed from the waste tray and placed in the error tray. A first step can be to verify that the mail class (first class, standard class, etc.) printed on label matches the mail class on the mail piece. If not, remove the label and place in appropriate outgoing tray. A second step can be to verify that the last name (and first name if available) matches the mail piece. If not, remove label and place in appropriate outgoing tray. A third step can be to verify that mailer endorsement related information is correct. A fourth step can be to verify that ACS (Address Change Service) related information is correct.

FIG. 1 depicts an automated waste mail sorting system in accordance with disclosed embodiments. Referring to FIG. 1, an automatic waste mail sorting system 100 is illustrated. A UAA mail piece 110 can be loaded into an automated mail sorting transport 112. Transport 112 can include mail handling and routing hardware, and one or more associated controllers, to control and coordinate various components and route mail piece 110. Near the front of the transport section 112, an OCR Camera 114 is positioned along the path in which UAA mail piece 110 is transported. OCR camera 114 captures an image of the UAA mail piece 110, and creates an image data set 116 which is passed to waste verification system 118. The image data set may include the image data along with image meta-data, such as the image attributes, reference numbers, and other meta-data to help the system identify and process the image and match the results with the appropriate mail piece 110. The image data set 116 is also passed to image management system (IMS) 120. Waste verification system 118 performs an optical character recognition (OCR) on the image data set 116, looking for specific fields and data related to waste verification. The analysis of the image data set 116 can look for alphanumeric characters, machine readable codes, graphical information, and any other types of information relevant to the determination of whether the mail piece 110 is a waste mail piece.

At about the same time, the image data set 116 can be passed to IMS 120 for potential redirection and relabeling. The IMS 120 may attempt to finalize the UAA mail 110 in one pass. The IMS employs a Forwarding Storage Unit (FSU) 124 and Advanced Forwarding Reader (AFR) 122 in order to finalize the mail in a few seconds. The goal is to finalize the mail before it reaches CIOSS stackers 126. If the IMS is able to finalize the mail, a label result 130 is sent to transport 112 so that label printer 128 can print corrected information on the UAA mail piece for delivery, return, or other disposition.

FIG. 2 depicts a method for automatically sorting waste mail in accordance with disclosed embodiments. Referring to FIG. 2, a method of automatically sorting undeliverable as addressed (UAA) mail is illustrated. An automatic mail sorting equipment can be configured to perform the method. The method can include capturing image of UAA mail piece with a camera at 210. In particular, the method can include capturing a first image of a first UAA mail piece with a camera connected to an automated mail transport to create first image data at 210. The method can include passing image data to a waste verification system at 212. The method can include passing the first image data to a waste verification system. The method can include performing OCR at 214. This can include performing at least optical character recognition on the first image data using the waste verification system to produce a first character recognition data set.

The method can include testing the first character recognition data set to determine whether the first UAA mail piece is a verified waste mail piece at 216. Testing at 216 can include four tests. Testing at 216 can include verifying a mail class printed on a redirect label matches the mail class on the first image data. Testing at 216 can include matching a name from the first image data with a name on a label associated with the first UAA mail piece. Testing at 216 can include verifying that Address Change Service (ACS) related information is correct. Testing at 216 can include verifying that mailer endorsement related information is correct.

If YES at 218, the first UAA mail piece can be a verified waste mail piece. The method can further include routing the first UAA mail piece into a first bin at 222, or other output. The method can include discarding the verified waste mail at 224. A “bin” is intended to refer to any output location or container for the specified mail pieces.

The method can further include testing the first character recognition data set to determine whether the first UAA mail piece is not verified as a waste mail piece, branching to NO at 220. If the first UAA mail piece is not a verified waste mail piece at 220, the method can include routing the mail piece to a second bin or other output at 226. The method can include manual processing at 228. The manual processing at 228 can result in discarding the mail piece, or it can result in determining the third mail piece is not a waste mail piece and redirecting the mail piece to a location indicated by information printed on the mail piece.

The method can include passing image data to the IMS at 230. The IMS can perform OCR at 230. This OCR can be separate from the OCR performed at 214, since the goal is to verify the fields using two independent OCRs.

The method can include classifying UAA mail piece at 234. In other words, the method can include classifying with the IMS the first UAA mail piece as one of finalized and non-finalized at 234. If the first UAA mail piece is classified as finalized at 236, the method can include outputting a first label result to a label printer and printing a new label on the first UAA mail piece at 240. The method can also include comparing the OCR data with the label data at 235. The result will be sent to 216 to compare the results of the label with those read by the waste verification system. If the first UAA mail piece is classified as non-finalized at 238, the method can include sorting the piece as non-finalized at 244.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words “means for” are followed by a participle.

What is claimed is:

1. A method for automatically sorting undeliverable as addressed (UAA) mail, comprising:

capturing a first image of a first UAA mail piece with a camera connected to an automated mail transport to create first image data;

passing the first image data to a waste verification system and performing optical character recognition on the first image data using the waste verification system to produce a first character recognition data set;

classifying the first UAA mail piece as finalized in a classification category that is one of a forward to new address category, a return to sender category, a waste category, or a send for manual handling category;

placing a label on the first UAA mail piece based on the classification category;

when the first UAA mail piece is finalized in the waste category, then:

testing the first character recognition data set compared to the label to determine whether the first UAA mail piece is a verified waste mail piece; and if the first UAA mail piece is a verified waste mail piece, then routing the first UAA mail piece into a first bin, and if the first UAA mail piece is not a verified waste mail piece, then routing the first UAA mail piece to a second bin.

2. The method according to claim 1, wherein when the classification category is a waste category and the first UAA mail piece is not a verified waste mail piece, then removing the label placed on the first UAA mail piece.

3. The method according to claim 1, wherein testing the first character recognition data set comprises verifying a mail class printed on the label matches the mail class on the first image data.

4. The method according to claim 1, wherein testing the first character recognition data set comprises matching a name from the first image data with a name on the label associated with the first UAA mail piece.

5. The method according to claim 1, wherein testing the first character recognition data set comprises verifying that mailer endorsement related information is correct.

6. The method according to claim 1, wherein testing the first character recognition data set comprises verifying that Address Change Service (ACS) related information is correct.

7. The method according to claim 1, further comprising:
determining that a second UAA mail piece is verified as a waste mail piece;
routing the second UAA mail piece to a first bin; and
discarding the second UAA mail piece.

8. The method according to claim 7, further comprising:
determining that a third UAA mail piece is not verified as a waste mail piece;
routing the third UAA mail piece to a second bin;
collecting at least the third UAA mail piece routed to the second bin;
manually determining whether the third UAA mail piece is a waste mail piece;
determining the third mail piece is a waste mail piece; and
discarding the third mail piece.

9. The method according to claim 8, further comprising:
determining that a fourth UAA mail piece is not verified as a waste mail piece,
routing the fourth UAA mail piece to a second bin;
collecting the fourth UAA mail piece routed to the second bin;
manually determining whether the fourth UAA mail piece is a waste mail piece;
determining the fourth UAA mail piece is not a waste mail piece; and
redirecting the fourth UAA mail piece to a location indicated by information printed on the mail piece.

10. The method according to claim 1, further comprising:
passing the first image data to an image management system (IMS); and
performing optical character recognition on the first image data using the IMS to produce a second character recognition data set.

11. The method according to claim 10, further comprising:
classifying with the IMS the first UAA mail piece as one of finalized and non-finalized.

12. An automatic mail sorting equipment, comprising:
an optical character recognition (OCR) camera configured to capture:
a first image of a first UAA mail piece connected to an automated mail transport to create first image data; and
pass the first image data to a waste verification system;
a waste verification system configured to perform optical character recognition on the first image data to produce a first character recognition data set;
an image management system (IMS) configured to classify the first UAA mail piece as finalized in a classification category that is one of forward to new address category, a returned to sender category, a waste category, or a send for manual handling category;
a label printer configured to place a label on the first UAA mail piece based on the classification category;
wherein the waste verification system is further configured, when the first UAA mail piece is finalized in the waste category, to:
test the first character recognition data set compared to the label to determine whether the first UAA mail piece is a verified waste mail piece; and
if the first UAA mail piece is a verified waste mail piece, then route the first UAA mail piece into a first bin, and
if the first UAA mail piece is not a verified waste mail piece, then route the mail piece to a second bin.

13. The automatic mail sorting equipment of claim 12, wherein the label printer is further configured to, when the classification category is a waste category and the first UAA mail piece is not a verified waste mail piece, remove the label placed on the first UAA mail piece.

14. The automatic mail sorting equipment of claim 12, wherein the waste verification system is further configured to test the first character recognition data set by verifying a mail class printed on the label matches the mail class on the first image data.

15. The automatic mail sorting equipment of claim 12, wherein the waste verification system is further configured to test the first character recognition data set by matching a name from the first image data with a name on the label associated with the first UAA mail piece.

16. The automatic mail sorting equipment of claim 12, wherein the waste verification system is further configured to test the first character recognition data set by verifying that mailer endorsement related information is correct.

17. The automatic mail sorting equipment of claim 12, wherein the waste verification system is configured to test the first character recognition data set by verifying that Address Change Service (ACS) related information is correct.

18. The automatic mail sorting equipment of claim 12, wherein the waste verification system is further configured to:
determine that a second UAA mail piece is verified as a waste mail piece;
route the second UAA mail piece to a first bin.

19. The automatic mail sorting equipment of claim 12, wherein:
the OCR camera is further configured to pass the first image data to the IMS; and
the IMS is further configured to perform at least optical character recognition on the first image data to produce a second character recognition data set.

20. The automatic mail sorting equipment of claim 19, further configured to classify with the IMS the first UAA mail piece as one of finalized and non-finalized.

* * * * *